United States Patent
Kurata et al.

(10) Patent No.: US 6,521,060 B1
(45) Date of Patent: Feb. 18, 2003

(54) FILLER METAL FOR USE IN WELDING OF NI-CR-W ALLOYS

(75) Inventors: Yuji Kurata, Ibaraki-ken (JP); Hirokazu Tsuji, Ibaraki-ken (JP); Hajime Nakajima, Ibaraki-ken (JP); Masami Shindo, Ibaraki-ken (JP); Teiichiro Saito, Shizuoka-ken (JP); Tamao Takatsu, Shizuoka-ken (JP)

(73) Assignees: Japan Atomic Energy Research Institute, Chiyoda-Ku (JP); Nippon Welding Rod Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/714,981

(22) Filed: Nov. 20, 2000

(51) Int. Cl.⁷ .............................................. C22C 19/05
(52) U.S. Cl. ........................ 148/428; 148/427; 420/442
(58) Field of Search ................. 148/428, 427; 420/442

(56) References Cited

U.S. PATENT DOCUMENTS 5,449,490 A * 9/1995 Kondo et al. ............... 420/443

FOREIGN PATENT DOCUMENTS

| JP | 51-29316 | 3/1976 |
| JP | 54-33212 | 10/1979 |
| JP | 5-47612 | 12/1988 |

OTHER PUBLICATIONS

Development of Ni–Cr–W Superalloys for High Temperature Components in High Temperature Gas–Cooled Reactors, 2: Examination of Effects of Minor Alloying Elements and Proposal of Optimum Chemical Composition, Report (1992), JAERI–M–92–137; Order No. DE93764469, 84pp. Avail.: NTIS From Energy Res. Abstr. 1993, 18(4), Abstr: No. 9473.*

* cited by examiner

Primary Examiner—Sikyin Ip
(74) Attorney, Agent, or Firm—Banner & Witcoff, Ltd.

(57) ABSTRACT

The improved filler metal for use in the welding of Ni—Cr—W alloys that are excellent in high-temperature strength and corrosion resistance and which are used in the hot-zone structures of high-temperature gas-cooled reactors, gas turbines, etc comprises on a mass basis $C \leq 0.05\%$, $Mn \leq 0.1\%$, $Si \leq 0.1\%$ ($Mn+Si \leq 0.1\%$), $Cr=17-20\%$, $W=20-23\%$ ($Cr+W=39-43\%$), $Ti=0.02-0.1\%$, $Zr \leq 0.03\%$, $Y \leq 0.015\%$, $B=0.0003-0.01\%$, $Al \leq 0.1\%$, $Mg \leq 0.05\%$, $Nb \leq 0.06\%$ ($10Zr+10B+5Nb+2Y \leq 0.3\%$), the balance being Ni and incidental impurities.

1 Claim, 3 Drawing Sheets

CRATER CRACK

BEAD CRACK

WELD CRACK

CRACK

FILLER METAL FOR USE IN WELDING OF NI-CR-W ALLOYS

BACKGROUND OF THE INVENTION

This Invention relates to a filler metal for use in the welding of Ni—Cr—W alloys that are excellent in high-temperature strength and corrosion resistance and which are used in the hot-zone structures of high-temperature gas-cooled reactors, gas turbines, etc.

Heretofore, Ni—Cr—W and Ni—Cr—W—Mo alloys have been developed as super-heat resistant materials for use in the hot-zone structures of high-temperature gas-cooled reactors, gas turbines, etc. These alloys are used at high temperatures near 1000° C. and required to be excellent in high-temperature creep strength and corrosion resistance.

To meet these requirements, Ni—Cr alloys strengthened with W or Mo have been proposed in Japanese Patent Public Disclosure Nos. 29316/1976, as well as Japanese Patent Publication Nos. 33212/1979 and 47612/1993. Welding is employed to fabricate structures with these alloys. Since the fabricated structures are put to prolonged service at high temperatures, the welded portions must also have high-temperature creep strength.

Japanese Patent Public Disclosure No. 29316/1976 teaches a heat-resistant alloy for use in the fabrication of welded structures with Ni—Cr—W and Ni—Cr—W—Mo alloys but the patent is limited to a compositional range of 3–20% W alloys that indicates low susceptibility to cracking in weldments. Ni—Cr—W alloys are so sensitive to weld cracking that if an alloy having an identical chemical composition to the base metal is used as a filler metal, weld cracking occurs, making it difficult to fabricate sound welded structures. In order to assure integrity of high-temperature structures, the welded portions must have a high-temperature creep strength comparable to that of the base metal. In the case of Ni—Cr—W alloys, no filler metal has yet been developed that can be worked Into a welding wire, that has good weldability and that produces welded portions having comparable high-temperature creep strength to the base metal.

SUMMARY OF THE INVENTION

An object, therefore, of the present invention is to provide a welding filler metal suitable for use with Ni—Cr—W alloys which have originally high susceptibility to cracking in weldments. The welding filler metal has enough hot workability Into a welding wire, excellent weldability and capability which produces welded portions having comparable high-temperature creep strength to the base metal.

This object of the invention can be attained by a filler metal for use in the welding of Ni—Cr—W alloys which comprises on a mass basis:

$C \leq 0.05\%$ $Mn \leq 0.1\%$ $Si \leq 0.1\%$ ($Mn+Si \leq 0.1\%$)

$Cr = 17-20\%$ $W = 20-23\%$ ($Cr+W = 39-43\%$)

$Ti = 0.02-0.1\%$ $Zr \leq 0.03\%$ $Y \leq 0.015\%$ $B = 0.0003-0.01\%$ $Al \leq 0.1\%$ $Mg \leq 0.05\%$ $Nb \leq 0.06\%$ ($10Zr+10B+5Nb+2Y \leq 0.3\%$)

the balance being Ni and incidental impurities.

DETAILED DESCRIPTION OF THE INVENTION

Figure 1:
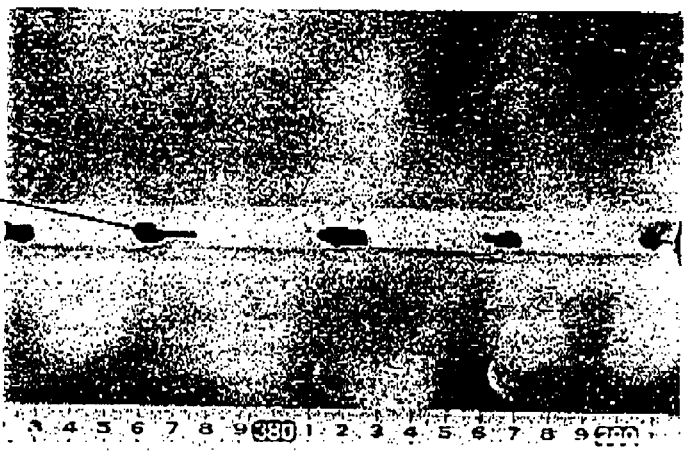
FIG. 1 shows the result of an FISCO test on alloy sample A6 of the invention.

The welding filler metal of the invention is an improvement of the Ni—Cr—W super heat-resistant alloy disclosed in Japanese Patent Publication No. 47612/1993 and of a base metal alloy having a Ni-18.5% Cr-21% W composition as a typical one. This welding filler metal has the minor elements controlled appropriately to produce a filler metal that can be worked into a welding wire, that has good weldability and that provides welded portions having comparable high-temperature creep strength to the base metal. We now describe the reasons for adding various elements to the welding filler metal of the invention and the criticality of the amount of each element.

Carbon (C) is an element that improves the hot workability of the alloy. Generally, carbon is an element that improves high-temperature creep strength, however, with Ni—Cr—W alloys which are used at high temperatures, creep strength is not remarkably dependent on the C content and during use C often migrates to the outside of the alloy. Further, high C contents induce precipitation of brittle carbides and make the alloy more sensitive to age embrittlement. For these reasons, the C content is held low, no more than 0.05%. The preferred C content is between 0.01 and 0.04%.

Manganese (Mn) and silicon (Si) help to deoxidize the alloy during melting and are also effective in improving its corrosion resistance. On the other hand, these elements lower hot workability and creep strength. In order to ensure hot workability and creep strength of the Ni—Cr—W alloy, the content of Mn or Si taken individually is limited not to exceed 0.1%: if both of them are contained, the sum is limited not to exceed 0.1%.

Chromium (Cr) Is necessary for ensuring the corrosion resistance and high-temperature creep strength of the weld metal If it is added excessively, the workability into a welding wire is impaired. According to the present invention, among the base metal alloys containing Cr in amounts of 16–28% that were proposed in Japanese Patent Publication No. 47612/1993, a Ni-18.5% Cr-21% W composition that satisfies the requirements for high corrosion resistance, increased high-temperature creep strength and good workability is selected as a typical composition and the Cr content is adjusted to vary between 17 and 20%.

Tungsten (W) is an important element for enhancing the creep strength of the Ni—Cr—W alloy through solid-solution strengthening and the precipitation of $\alpha_2$-phase. Hence, the sum of Cr and W contents Is limited to lie within the range from 39 to 43% where $\alpha_2$-phase precipitation occurs. Considering the required Cr content and the region of $\alpha_2$-phase precipitation, the W content is controlled to lie between 20 and 23%.

Titanium (Ti) is an element useful In decreasing the weld crack sensitivity of the Ni—Cr—W alloys. In order to have this effect, Ti must be added in an amount of at least 0.02%. On the other hand, excessive addition of Ti reduces its effectiveness in decreasing weld crack sensitivity and deteriorates corrosion resistance. Therefore, the upper limit of Ti addition is set at 0.1% and the Ti content is specified to lie between 0.02 and 0.1%.

Zirconium (Zr) is an element that Improves hot workability and which contributes to enhancing high-temperature creep strength. On the other hand, Zr promotes hot cracking on welding. When more than 0.03% of Zr was added, sensitivity to weld cracking increased and a Zr-rich phase attributable to cracking was detected In the weld metal. Hence, the Zr content Is limited not to exceed 0.03%. This upper limit of Zr addition is calculated from the relation of weld crack sensitivity index (10Zr+10B+5Nb+2Y≦0.3%) to be described below for an assumed case where no other elements (B, Nb and Y) are present.

Yttrium (Y) is an important element for improving corrosion resistance and it also contributes to enhanced hot workability If the Y content exceeds 0.015%, both creep strength and weldability deteriorate. Hence, the Y content is limited not to exceed 0.015%, Boron (B) as well as Zr improves hot workability and contributes to enhanced high-temperature creep strength. These effects of B are slightly insufficient if its level is 0.0002% and the desired effects are increased if B is contained in an amount of at least 0.0003%. On the other hand, B forms low-melting point compounds and adding more than 0.01% of B will promote weld cracking. Therefore, the B content is adjusted to lie between 0.0003 and 0.01%.

Magnesium (Mg) has deoxidizing and desulfurizing actions. If it is added in a trace amount to the filler metal, sensitivity to weld cracking decreases. If more than 0.05% of Mg is present in the weld metal, the metal's sensitivity to weld cracking is markedly increased. Therefore, the Mg content is limited not to exceed 0.05%. The preferred Mg content is between 0.0001 and 0.05%.

Aluminum (Al) helps to deoxidize the alloy during Belting but it also lowers corrosion-resistance through grain boundary oxidation. Therefore, the Al content is limited not to exceed 0.1% which is also the upper limit of Al In the base metal.

Niobium (Nb) is an element that not only enhances weld cracking sensitivity but also lowers corrosion resistance. Therefore, the Nb content is limited not to exceed 0.06%. This upper limit of Nb addition Is calculated from the relation of weld crack sensitivity index (10Zr+10B+5Nb+2Y≦0.3%) to be described below for an assumed case where no other elements (Zr, B and Y) are present.

The present invention is characterized by specifying a weld crack sensitivity index for Zr, B, Nb and Y which render the alloy system of interest very sensitive to weld cracking. For these four elements, coefficients were determined according to their contributions to enhanced crack sensitivity and their compound effect was taken into account to specify the index as 10Zr+10B+5Nb+2Y. By adjusting this index to 0.3% or below, a filler metal can be produced that ensures excellent weldability for the alloy system of interest.

EXAMPLES

Examples of the invention are given below in contrast with comparative examples. The chemical compositions of the test samples are set forth in Table 1, in which A1–A6 refer to alloy samples of the invention and B1–B15 refer to comparative samples. Using these alloy samples, weldability tests were conducted by tungsten inert-gas (TIG) welding under the conditions set forth in Table 2 (for manual TIG) and Table 3 (for automatic TIG).

TABLE 1-1

| Section | No. | Composition (mass %) | | | | | | |
|---|---|---|---|---|---|---|---|---|
| | | C | Mn | Si | Cr | W | Ti | Zr |
| Invention | A1 | 0.019 | 0.019 | 0.04 | 18.75 | 21.79 | 0.07 | 0.016 |
| | A2 | 0.02 | 0.03 | 0.06 | 18.4 | 21 | 0.07 | 0.01 |
| | A3 | 0.015 | 0.03 | 0.05 | 18.5 | 21.4 | 0.07 | 0.01 |
| | A4 | 0.028 | <0.02 | 0.07 | 18.42 | 21.52 | 0.08 | <0.001 |
| | A5 | 0.03 | 0.02 | 0.05 | 18.4 | 21.5 | 0.063 | <0.002 |
| | A6 | 0.027 | <0.02 | 0.06 | 18.5 | 21.5 | 0.06 | 0.006 |
| Comparison | B1 | 0.04 | 0.01 | <0.01 | 18.5 | 21.4 | 0.002* | 0.03 |
| | B2 | 0.02 | 0.01 | <0.01 | 18.3 | 21.2 | 0.074 | 0.041* |
| | B3 | 0.032 | 0.01 | <0.01 | 18.6 | 21.41 | 0.2* | 0.03 |
| | B4 | 0.03 | 0.01 | <0.01 | 18.33 | 21.34 | 0.07 | 0.03 |
| | B5 | 0.028 | 0.01 | <0.01 | 18.5 | 21.37 | 0.08 | 0.03 |
| | B6 | 0.03 | 0.01 | <0.01 | 18.25 | 21.37 | 0.07 | 0.03 |
| | B7 | 0.03 | 0.05 | 0.09 | 18.7 | 21.3 | 0.06 | 0.02 |
| | B8 | 0.03 | 0.02 | 0.1 | 18.8 | 21.3 | 0.06 | 0.03 |
| | B9 | 0.03 | 0.06 | <0.01 | 18.7 | 21.2 | 0.07 | 0.04* |
| | B10 | 0.02 | 0.03 | 0.06 | 18.5 | 21 | 0.07 | 0.02 |
| | B11 | 0.024 | 0.03 | 0.06 | 18.4 | 21.6 | 0.07 | 0.02 |
| | B12 | 0.025 | 0.02 | 0.05 | 18.4 | 21.3 | 0.07 | 0.02 |
| | B13 | 0.03 | 0.02 | 0.05 | 18.4 | 21.4 | 0.081 | 0.023 |

TABLE 1-1-continued

| | | Composition (mass %) | | | | | | |
|---|---|---|---|---|---|---|---|---|
| Section | No. | C | Mn | Si | Cr | W | Ti | Zr |
| | B14 | 0.024 | <0.02 | 0.08 | 18.28 | 21.68 | 0.08 | <0.001 |
| | B15 | 0.032 | <0.02 | 0.058 | 18.5 | 21.5 | 0.07 | <0.001 |

TABLE 1-2

| | | Composition (mass %) | | | | | | Weld crack sensitivity index |
|---|---|---|---|---|---|---|---|---|
| Section | No. | Y | B | Al | Mg | Nb | Ni | 10Zr + 10B + 5Nb + 2Y |
| Invention | A1 | 0.01 | 0.003 | 0.038 | 0.004 | 0.041 | bal. | 0.231 |
| | A2 | 0.001 | 0.0037 | 0.05 | 0.001 | 0.02 | bal. | 0.239 |
| | A3 | 0.004 | 0.0008 | 0.04 | 0.001 | 0.02 | bal. | 0.216 |
| | A4 | 0.005 | 0.002 | 0.026 | 0.0001 | 0.028 | bal. | 0.18 |
| | A5 | <0.001 | 0.002 | 0.052 | 0.001 | 0.02 | bal. | 0.142 |
| | A6 | 0.003 | 0.003 | 0.02 | 0.002 | <0.001 | bal. | 0.101 |
| Comparison | B1 | 0.009 | 0.0046 | 0.02 | <0.001 | <0.01 | bal. | 0.414* |
| | B2 | 0.0079 | 0.0023 | 0.028 | <0.001 | 0.0036 | bal. | 0.467* |
| | B3 | 0.011 | 0.0057 | 0.007 | <0.001 | 0.033 | bal. | 0.544* |
| | B4 | 0.022* | 0.0057 | 0.007 | <0.001 | 0.032 | bal. | 0.561* |
| | B5 | 0.009 | 0.0058 | 0.008 | 0.005 | 0.032 | bal. | 0.536* |
| | B6 | 0.009 | 0.0057 | 0.007 | 0.01 | 0.032 | bal. | 0.535* |
| | B7 | 0.007 | 0.004 | 0.04 | <0.001 | 0.034 | bal. | 0.424* |
| | B8 | 0.007 | 0.005 | 0.05 | <0.001 | 0.033 | bal. | 0.529* |
| | B9 | 0.005 | 0.005 | 0.05 | 0.001 | 0.034 | bal. | 0.63* |
| | B10 | 0.006 | 0.0016 | 0.06 | 0.001 | 0.02 | bal. | 0.328* |
| | B11 | 0.004 | 0.0041 | 0.03 | 0.009 | 0.03 | bal. | 0.399* |
| | B12 | 0.005 | 0.0042 | 0.03 | 0.007 | 0.03 | bal. | 0.402* |
| | B13 | 0.004 | 0.0024 | 0.066 | 0.002 | 0.02 | bal. | 0.362* |
| | B14 | 0.004 | 0.0002* | 0.028 | 0.0001 | 0.027 | bal. | 0.155 |
| | B15 | <0.001 | 0.0002* | 0.018 | 0.001 | <0.001 | bal. | 0.019 |

TABLE 2

| Shape and size of filler metal (mm) | Electrode diameter (mm) | Welding current (A) | Arc voltage (V) | Ar flow rate (l/min) | Welding speed (mm/min) |
|---|---|---|---|---|---|
| Square bar 3 × 3 × 230 | φ3.2 | 100~200 | 11~17 | 10~15 | 80~200 |

TABLE 3

| Shape and size of filler metal (mm) | Electrode diameter (mm) | Welding current (A) base | Welding current (A) peak | Arc voltage (V) | Ar flow rate (l/min) | Welding speed (mm/min) |
|---|---|---|---|---|---|---|
| Wire φ1.2 | φ3.2 | 150 | 170 | 8~10 | 15~20 | 100 |

The weldability tests on A1, A2 and B1–B13 were conducted by manual TIG welding using 3×3 (mm) square rods as filler metals, and the tests on A3–A6, B14 and B15 were conducted by automatic TIG welding using welding wires of 1.2 mm$^4$ as filler metals.

The weldability of the filler metals was evaluated on the basis of overall results of a butt welding crack test by restraint jig with C-shaped flame (hereunder abbreviated as FISCO test), an overlay welding crack sensitivity test, a welded joint bending test and a microstructure test on weld metal. In the overlay welding crack sensitivity test, the surfaces of the padded metal zones removed by machining about 4 mm in depth. The overlay weld metal reheated by multipass was subjected to a liquid penetrant test so as to check for the presence of weld cracks.

Alloy sample A1 was also used as a base metal to prepare specimens for the weldability test and specimens for testing the creep strength of the weldments. Among the alloy samples that proved to have good weldability, A2–A6 and B14 were used as filler metals in TIG welding to prepare welded joints, from which creep test specimens were prepared; the creep test specimens had a diameter of 6 mm and a gage length of 30 mm. For alloy sample A2, a welded joint test specimen was used that contained both the base metal and the weld metal between gage points; for alloy sample A3, both a welded joint test specimen and a weld metal test specimen solely composed of the weld metal were used; for alloy samples A4, A5, A6 and B14, weld metal test specimens were used. The creep test was conducted at 1000° C. and 29.4 MPa. The specimens which ruptured in times no shorter than 80% of the time to rupture for the base metal were found to pass the creep test and the specimens that failed the test were rated to have only insufficient creep rupture strength.

Table 4 shows the results of evaluation of weldability and the creep rupture strength of the weldments. In the column of "weldability". ○ refers to good weldability and X poor weldability. In the column of "creep rupture strength", ○ refers to sufficient strength and X insufficient strength, with the ratio of the rupture time of the weldments to that of the base metal being put in parentheses.

TABLE 4

| Section | No. | Weld-ability | Creep rupture strength at 1000° C. and 29.4 Mpa (rupture time of welded zone vs base metal) | | Remark |
|---|---|---|---|---|---|
| Invention | A1 | ○ | — | | only weldability test performed |
| | A2 | ○ | welded joint | ○ (1.61) | |
| | A3 | ○ | weld metal | ○ (1.18) | |
| | | | welded joint | ○ (0.89) | |
| | A4 | ○ | weld metal | ○ (0.83) | |
| | A5 | ○ | weld metal | ○ (0.81) | |
| | A6 | ○ | weld metal | ○ (2.16) | |
| Comparison | B1 | X | — | | |
| | B2 | X | — | | |
| | B3 | X | — | | |
| | B4 | X | — | | |
| | B5 | X | — | | |
| | B6 | X | — | | |
| | B7 | X | — | | |
| | B8 | X | — | | |
| | B9 | X | — | | |
| | B10 | X | — | | |
| | B11 | X | — | | |
| | B12 | X | — | | |
| | B13 | X | — | | |
| | B14 | ○ | weld metal | X (0.68) | |
| | B15 | ○ | — | | only weldability test performed |

In Table 1, the values of alloy elements in comparative samples and their weld crack sensitivity index which are outside the ranges specified by the invention are marked with an asterisk (*). When calculating the weld crack sensitivity index, the elements present in very small quantities that were below the detection limits were assumed to have concentrations equal to their respective detection limits As shown in Table 4, the alloys of the Invention had good weldability and did not experience weld cracking in the weldability test; their creep strength was satisfactory whether the creep specimen was a welded joint or solely composed of a weld metal. In contrast, the comparative alloy samples had either poor weldability or insufficient creep rupture strength.

Figure 2:
FIG. 2 shows the result of an FISCO test on comparative alloy sample B2.
Figure 3:
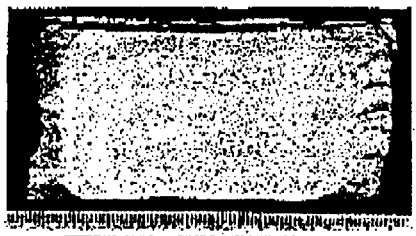
FIG. 3 shows the result of a liquid penetrant test after overlay welding on alloy sample A6 of the invention.
Figure 4:
FIG. 4 shows the result of a liquid penetrant test after overlay welding on comparative alloy sample B2.
Figure 5:
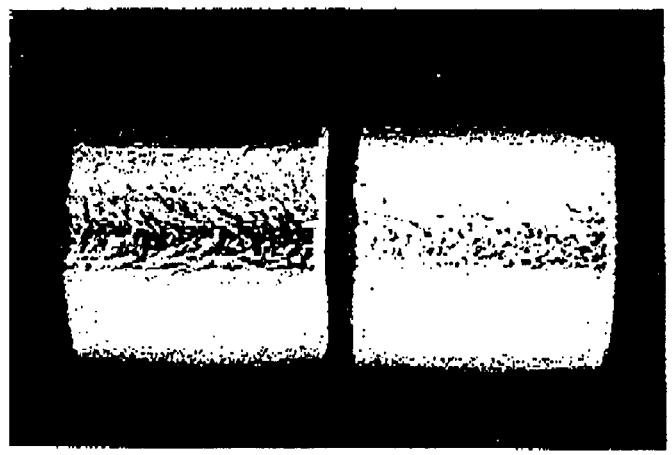
FIG. 5 shows the result of a bending test on a welded joint of alloy sample A1 of the invention.
Figure 6:
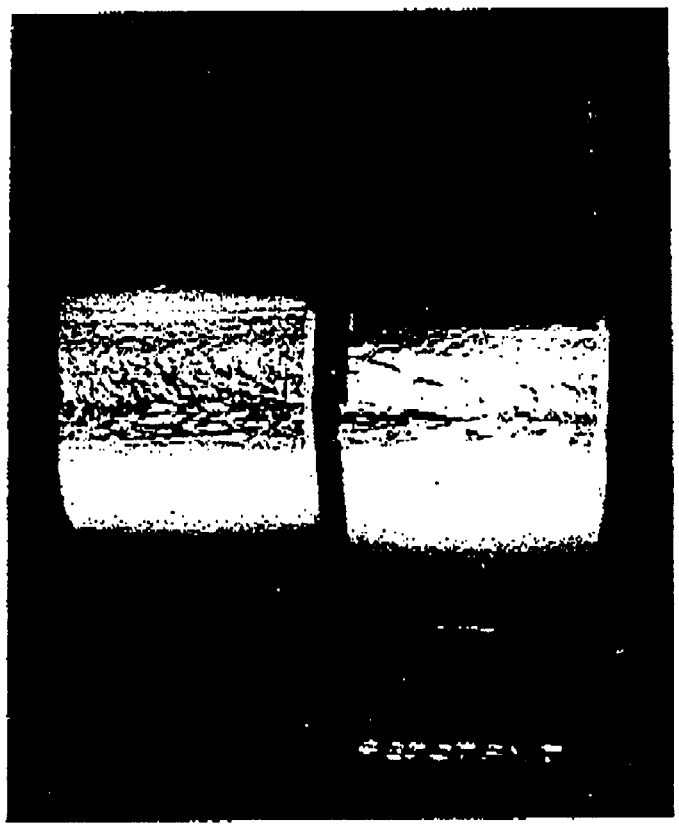
FIG. 6 shows the result of a bending test on a welded joint of comparative alloy sample B13.
Figure 7:
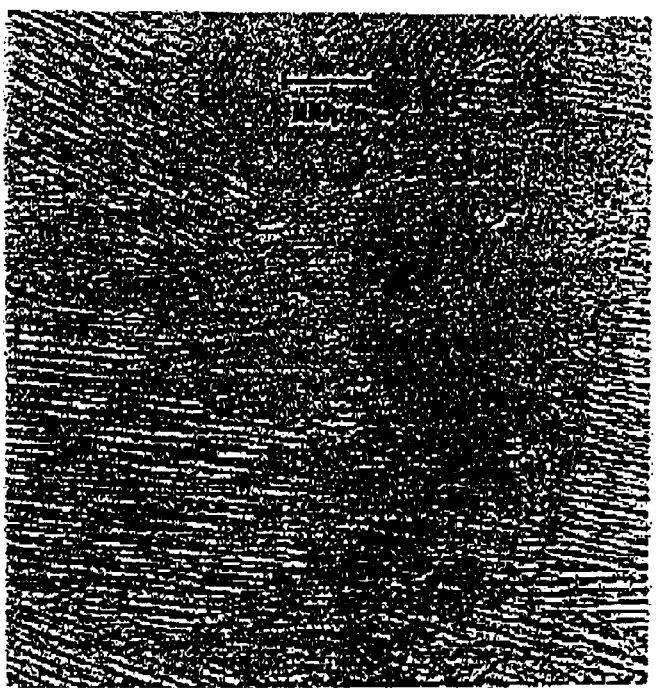
FIG. 7 shows the result of a microstructure test on a weld metal of alloy sample A1 of the invention.
Figure 8:
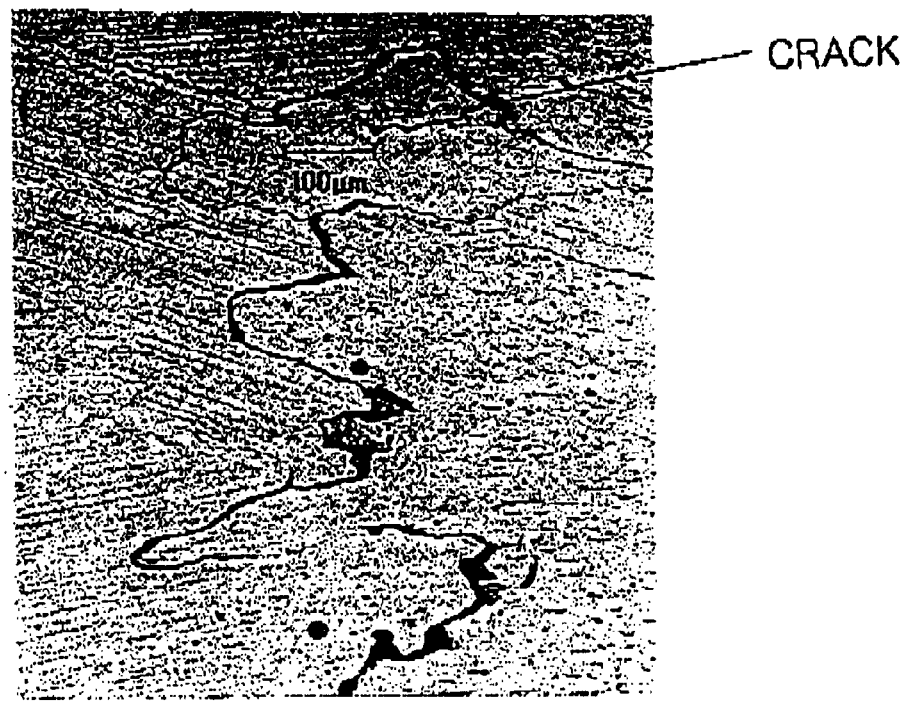
FIG. 8 shows the result of a microstructure test on a weld metal of comparative alloy sample B4.

FIG. 1 shows the result of a FISCO test on invention alloy sample A6. It experienced crater cracking but did not experience bead cracking; obviously, A6 had low sensitivity to weld cracking. FIG. 2 shows the result of a FISCO test on comparative welding alloy sample B2; obviously, it experienced marked bead cracking. FIG. 3 shows the result of a liquid penetrant test after overlay welding on A6: obviously, no weld cracking was observed in the liquid penetrant test on A6. On the other hand, marked hot weld cracking occurred to B2 as shown in FIG. 4. FIG. 5 shows the result of a welded joint bending test on A1: the welded joint of A1 could be bent through 180°, demonstrating the good weldability of A1. FIG. 6 shows the result of a welded joint bending test on comparative alloy sample B13; the welded joint of B13 ruptured in the weld metal before bending through 180°. FIG. 7 shows the result of a microstructure test on the weld metal of A1; obviously, no cracking occurred, FIG. 8 shows the result for comparative alloy sample B4; extensive cracks occurred in the grain boundaries of the weld metal.

Comparative samples B1–B13 had poor weldability (see Table 4) and as is clear from Table 1, the values of weld crack sensitivity index (10Zr+10B+5Nb+2Y) for these samples were in excess of 0.3%. In addition, B1 had only an insufficient amount (0.002%) of Ti to inhibit hot weld cracking; B2 had an excessive amount (0.041%) of Zr which would increase weld crack sensitivity; B3 had an excessive amount (0.2%) of Ti and B9 had an excessive amount (0.04%) of Zr and both experienced weld cracking. Alloy samples B1–B13 had such poor weldability that they experienced weld cracking and it was impossible to evaluate the creep rupture strength of the weldments.

As for comparative samples B14 and B15, the values of weld crack sensitivity index (10Zr+10B+5Nb+2Y) were no more than 0.3% and no hot weld cracking occurred. Sample B14 had good weldability; however, due to undesirably low B content (0.0002%) and a comparative low content of Zr added to enhance creep strength, the rupture time of the weld metal vs base metal as measured in the creep test decreased to 0.68.

The filler metal of the invention for welding Ni—Cr—W alloys is suitable for use with base metals made of the Ni—Cr—W super heat-resistant alloys that are described in Japanese Patent Publication No. 47612/1993 and which contain 17–20% of Cr and 20–23% of W and it can be worked into welding wires, has excellent weldability and enables the production of weldments that have comparable high-temperature creep rupture strength to the base metal. Hence, the filler metal of the invention is applicable to the fabrication of welded structures that are to be used at high temperatures in the neighborhood of 1000° C.

What is claimed is:
1. A filler metal for TIG welding having sufficient hot workability for use as a welding wire, excellent weldability by having the ability to bend a welded joint portion through 180° and 0.3 or below crack sensitivity index (10Zr+10B+5Nb+2Y) and being able to produce a welded portion having longer creep rupture time at 1,000° C. than 80 percent of the rupture time of a base metal;

comprising on a mass basis:
C=0.01–0.04%
Mn≦0.1%
Si≦0.1% (Mn+Si≦0.1%)
Cr=17–20%
W=20–23% (Cr+W=39–43%)
Ti=0.02–0.1%
Zr≦0.003%
Y≦0.015%
B=0.0003–0.01%
Al≦0.1%
Mg=0.001–0.05%
Nb≦0.06% (10Zr+10B+5Nb+2Y≦0.3%)
the balance being Ni and identical impurities.

* * * * *

UNITED STATES PATENT AND TRADEMARK OFFICE
CERTIFICATE OF CORRECTION

PATENT NO. : 6,521,060 B1
DATED : February 18, 2003
INVENTOR(S) : Yuji Kurata et al.

It is certified that error appears in the above-identified patent and that said Letters Patent is hereby corrected as shown below:

Column 8,
Line 53, replace "Zr≤0.003%" with -- Zr≤0.03% --.
Line 57, replace "Mg=0.001-0.05%" with -- Mg=0.0001-0.05% --.

Signed and Sealed this

Thirtieth Day of May, 2006

JON W. DUDAS
*Director of the United States Patent and Trademark Office*